US008548279B1

(12) United States Patent
Ruzon et al.

(10) Patent No.: US 8,548,279 B1
(45) Date of Patent: Oct. 1, 2013

(54) IMAGE MATCHING USING ORIENTATIONAL CONSISTENCY

(71) Applicant: A9.com, Inc., Palo Alto, CA (US)

(72) Inventors: Mark Andrew Ruzon, Mountain View, CA (US); Donald Tanguay, Sunnyvale, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 13/773,451

(22) Filed: Feb. 21, 2013

Related U.S. Application Data

(62) Division of application No. 12/321,235, filed on Jan. 16, 2009, now Pat. No. 8,401,342.

(51) Int. Cl.
*G06K 9/60* (2006.01)

(52) U.S. Cl.
USPC ........... 382/305; 382/181; 382/190; 382/195; 382/209; 382/276; 707/706; 707/736; 707/741; 707/748

(58) Field of Classification Search
None
See application file for complete search history.

(56) References Cited

U.S. PATENT DOCUMENTS

| | | | |
|---|---|---|---|
| 6,591,007 B1 * | 7/2003 | Petkovic et al. | 382/162 |
| 6,594,383 B1 * | 7/2003 | Syeda-Mahmood | 382/162 |
| 6,741,757 B1 * | 5/2004 | Torr et al. | 382/294 |
| 6,792,164 B2 * | 9/2004 | Syeda-Mahmood | 382/305 |
| 7,072,872 B2 | 7/2006 | Caid et al. | |
| 7,206,437 B2 | 4/2007 | Kramer et al. | |
| 7,251,637 B1 | 7/2007 | Caid et al. | |
| 8,184,155 B2 | 5/2012 | Ke et al. | |
| 2005/0002571 A1 | 1/2005 | Hiraga et al. | |
| 2006/0013450 A1 | 1/2006 | Shan et al. | |
| 2007/0260639 A1 | 11/2007 | Tobin et al. | |
| 2008/0118146 A1 | 5/2008 | Cieplinski | |
| 2008/0144943 A1 | 6/2008 | Gokturk et al. | |
| 2009/0254543 A1 | 10/2009 | Ber et al. | |
| 2010/0080425 A1 * | 4/2010 | Bebis et al. | 382/125 |

OTHER PUBLICATIONS

Zhang et al. "A Robust Technique for Matching Two Uncalibrated Images through the Recovery of the Unknown Epipolar Geometry", 1995, Artificial Intelligence Journal, vol. 78, No. 1-2, pp. 87-119.*
Zhao et al. "Image matching by multiscale oriented corner correlation", 2006, Proceedings of the 7th Asian Conference on Computer Vision, pp. 928-937.*

(Continued)

*Primary Examiner* — Matthew Bella
*Assistant Examiner* — Jason Heidemann
(74) *Attorney, Agent, or Firm* — Novak Druce Connolly Bove + Guigg LLP

(57) ABSTRACT

A method, system and computer program product for matching images is provided. The images to be matched are represented by feature points and feature vectors and orientations associated with the feature points. First, putative correspondences are determined by using feature vectors. A subset of putative correspondences is selected and the topological equivalence of the subset is determined. The topologically equivalent subset of putative correspondences is used to establish a motion estimation model. An orientation consistency test is performed on the putative correspondences and the corresponding motion estimation transformation that is determined, to avoid an infeasible transformation. A coverage test is performed on the matches that satisfy orientation consistency test. The candidate matches that do not cover a significant portion of one of the images are rejected. The final match images are provided in the order of decreasing matching, in case of multiple images satisfying all the test requirements.

25 Claims, 8 Drawing Sheets

(56) References Cited

OTHER PUBLICATIONS

International Search Report mailed on Mar. 5, 2010, for International Application No. PCT/US10/21206 filed on Jan. 15, 2010, 2 pages.
Läbe, T. et al., "Automatic Relative Orientation of Images," *Proceedings of the 5th Turkish-German Joint Geodetic Days*, Mar. 29-31, 2006, located at <http://citeseerx.ist.psu.edu/viewdoc/summary?doi=10.1.1.129,373>, retrieved on Feb. 17, 2010, 6 pages.
Paiva, "Topological Equivalence and Similarity in Multi-Representation Geographic Databases", 1998, The University of Maine—Electronic Theses and Dissertations.
Jia et al. "Photo-to-Search: Using Camera Phones to Inquire of the Surrounding World", 2006, Proceedings of the 7th International Conference on Mobile Data Management (MDM'06).
Lowe "Distinctive Image Features from Scale-Invariant Keypoints" 2004, International Journal of Computer Vision.
Chu et al., "Image-guided tours: Fast-approximated sift with u-surf features", (2007), Technical Report, Stanford University, Department of Electrical Engineering.
"Learning Local Image Descriptors" by Simon A.J. Winder and Matthew Brown, Proceedings of Computer Visions and Pattern Recognition (2007).
"Object Retrieval with Large Vocabularies and Fast Spatial Matching" by James Philbin, et al, Proceedings of Computer Vision and Pattern Recognition (2007).
"Random Sample Consensus: A Paradigm for Modeling Fitting with Applications to Image Analysis and Automated Cartography" by Martin A. Fischler and Robert C. Bolles, Communications of the ACM, vol. 24, pp. 381-395 (Jun. 1981).

\* cited by examiner

IMAGE MATCHING USING ORIENTATIONAL CONSISTENCY

CROSS-REFERENCE TO RELATED APPLICATION

This application is a divisional of U.S. application Ser. No. 12/321,235, entitled "System and Method to Match Images Using Topologically Equivalent Correspondences," filed Jan. 16, 2009, now U.S. Pat. No. 8,401,432 which is incorporated herein by reference for all purposes.

BACKGROUND

The invention relates generally to the field of digital image processing. More specifically, the invention relates to a method and system for matching an image with another image.

Image matching is a fundamental technique that is being used in computer vision, object recognition, motion tracking, 3D modeling, and the like. Image matching is performed to check whether two images have the same content. The two images need not be exactly the same. For example, one image may be rotated or taken from a different viewpoint as compared to the other image, or it may be a zoomed version of the other image. Further, the two images may be taken under different lighting conditions. Despite such variations in the two images, they contain the same content, scene or object. Therefore, image matching techniques are used to match images effectively.

Typical image matching algorithms take advantage of the fact that an image of an object or scene contains a number of feature points. Feature points are specific points in an image that are robust to changes in image rotation, scale, and viewpoint or lighting conditions. This means that these feature points will often be present in both images, even if the two images differ in the manner described earlier. Therefore, the first stage of the image matching algorithm is to find these feature points in the image. Typically, an image pyramid is constructed to determine the feature points of an image. The image pyramid is the scale-space representation of the image, i.e., it contains various pyramid images, each of which is a representation of the image at a particular scale. The scale-space representation enables the image matching algorithm to match images that differ in overall scale. After determining the feature points of the pyramid images in the image pyramid, orientations of the feature points are determined based on the local image gradient at the feature points. These orientations provide invariance of the feature points to rotation. The feature vector representation provides for significant change in local distortion and illumination, i.e., the feature vector is invariant to distortion and change in lighting conditions.

The feature points, their orientations and feature vectors of the pyramid images form a complete representation of the image. These representations can be compared across images to find a matching image. A pair of images is matched based on matching the feature points of the images. The pair of images can be determined to be a match when a sufficient number of feature points match the corresponding feature points of the other image both visually and geometrically. Feature vectors that are close to each other are visually similar, and the corresponding feature points are called 'putative correspondences' or 'correspondences'. The putative correspondences are generally processed by a statistical algorithm to test geometric consistency.

Generally, for geometric matching of images, the statistical algorithm used is the Random Sample Consensus (RANSAC) algorithm, although other variants of RANSAC-like algorithms or other statistical algorithms can be used. In RANSAC, a small set of putative correspondences is randomly sampled. Thereafter, a geometric transformation is generated using these sampled feature points. After generating the transformation, the putative correspondences that fit the model are determined. The putative correspondences that fit the model are geometrically consistent and called 'inliers.' Thereafter, the total number of inliers is determined. The above mentioned steps are repeated until the number of repetitions/trials is greater than a predefined threshold or the number of inliers for the image is sufficiently high to determine an image as a match. The RANSAC algorithm returns the model with the highest number of inliers corresponding to the model.

One problem associated with using this type of method is that the set of possible transformations generated by the statistical algorithm may be larger than the set of physically valid transformations. For example, the transformation may flip one side of a rectangle, causing a twist that is impossible to achieve with a rigid object. In another example, it may flip the entire rectangle, a transformation that is achievable only by taking a picture of a reflection of the object. This can lead to incorrect matching of images. Further, this can cause useless computation, since analysis of parameters/points generated by the transformation is done even though the transformation itself may be physically invalid or infeasible.

Each feature point in the putative correspondence has an orientation associated with it. In applications where rotational invariance is required, for a transformation to be valid, it should preferably preserve the orientations of the two feature points in a putative correspondence. Many applications that use RANSAC do not take this constraint into account.

Even if the putative correspondences are determined to be closely matching, the putative correspondences alone generally do not ensure that the pair of images forms a final match. Putative correspondences only give the information about visual similarities between feature points of the pair of images. This is generally not sufficient to determine the final match between the pair of images. There is a possibility that corresponding areas of both images may generate multiple putative correspondences. For instance, if an image feature is salient at more than one scale, multiple feature points may be generated, possibly resulting in multiple putative correspondences. Choosing one of these putative correspondences to generate the transformation means that the other putative correspondences will also become inliers, thereby creating a false sense of information that the two images that are matched using this transformation are truly matching. Removing all but one of a set of corresponding feature points a priori is an incorrect approach as there may not be multiple putative correspondences for different query images, and there is no way to say which one is best because there may be multiple putative correspondences that are falsely interpreted. In other words, using only putative correspondences generally cannot provide enough information so as to establish a clear match between the query image and the database images.

Moreover, it might be possible that the two images may share an element or a small part of the image, like a logo for a corporation or other entity. The images may also share a piece of text in the same font. These shared elements may create enough inliers to declare an image match, while in reality the two images are not similar. Further, there can be a case that a query image may have multiple image objects, each of which is represented in a separate database image. The database images are a plurality of images with which the query image needs to be matched.

There exists a need for an improved image-matching method for overcoming the limitations mentioned above.

SUMMARY

An objective of the present invention is to provide a method, system and computer program product for matching a query image against a plurality of images.

An objective of the present invention is to provide a method, system and computer program product for determining geometrically consistent correspondences.

An objective of the present invention is to provide a method, system and computer program product for generating physically valid transformations.

An objective of the present invention is to provide a method, system and computer program product for matching two or more images of the same object or scene captured from different viewpoints and/or lighting conditions.

Various embodiments of the present invention provide a method, system and computer program product for image matching. First, the putatively corresponding images, i.e. images that have a sufficiently large number of putative correspondences, are determined from a plurality of images by finding putative correspondences between the plurality of images and the query image. Thereafter, before a transformation is determined for the image, a topological equivalence test is performed to avoid any physically invalid transformation. In the topological equivalence test, the topological equivalence between the feature points of a subset of putative correspondences in the putatively corresponding images and the query image is determined. If the subset of putative correspondences fails the topological equivalence test, it is discarded and a new subset of putative correspondences is selected to establish the transformation. Furthermore, an orientation consistency test is performed on the feature points obtained from the transformation to further test the validity of the transformation. Thereafter, candidate matches are determined by performing motion estimation using the subset of putative correspondences. The putative correspondences between the query image and the database image which fit the transformation are determined as inliers.

Thereafter a coverage test is performed on the inliers of the images. In the coverage test, a percentage of area enclosed by inliers of both the query image and database image is measured. The image is discarded as a candidate match when the maximum of the two percentages is less than a predefined threshold. Thereafter, the final image matches are identified based on a set of conditions. The first condition is that the number of inliers for the candidate images is greater than a predefined number of inliers. Further, the second condition is that the Root Mean Square (RMS) error associated with the candidate match is less than a predefined threshold. The images that satisfy these tests are returned as final match images. There could be a case that more than one image satisfy these tests. In such cases the measurements from the coverage test are used to determine whether multiple database images were matched. If the same area of the image matches multiple database images, these images are returned in descending order of the number of inliers the final match image contains.

BRIEF DESCRIPTION OF THE DRAWINGS

Various embodiments of the invention will hereinafter be described in conjunction with the appended drawings provided to illustrate and not to limit the invention, wherein like designations denote like elements, and in which.

Skilled artisans will appreciate that the elements in the figures are illustrated for simplicity and clarity to help improve understanding of the embodiments of the present invention.

DETAILED DESCRIPTION OF THE INVENTION

Various embodiments of the present invention relate to a method, system and computer program product for matching images. The method uses the feature points present in an image to represent the image. The first step in the method is to determine putative correspondences between a query image and a database image. A putative correspondence is a pair of feature vectors in the query image and a database image that are visually similar to each other. After the putative correspondences are determined, a topological equivalence test is performed on a subset of putative correspondences to avoid forming a physically invalid transformation. After the transformation is determined, an orientation consistency test is performed. An offset point is determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation is performed using the subset of putative correspondences which satisfy the topological equivalence test. The motion estimation is performed to determine the putative correspondences that are geometrically consistent between the query image and the database image. The final match images are returned based on a set of conditions.

Figure 1:
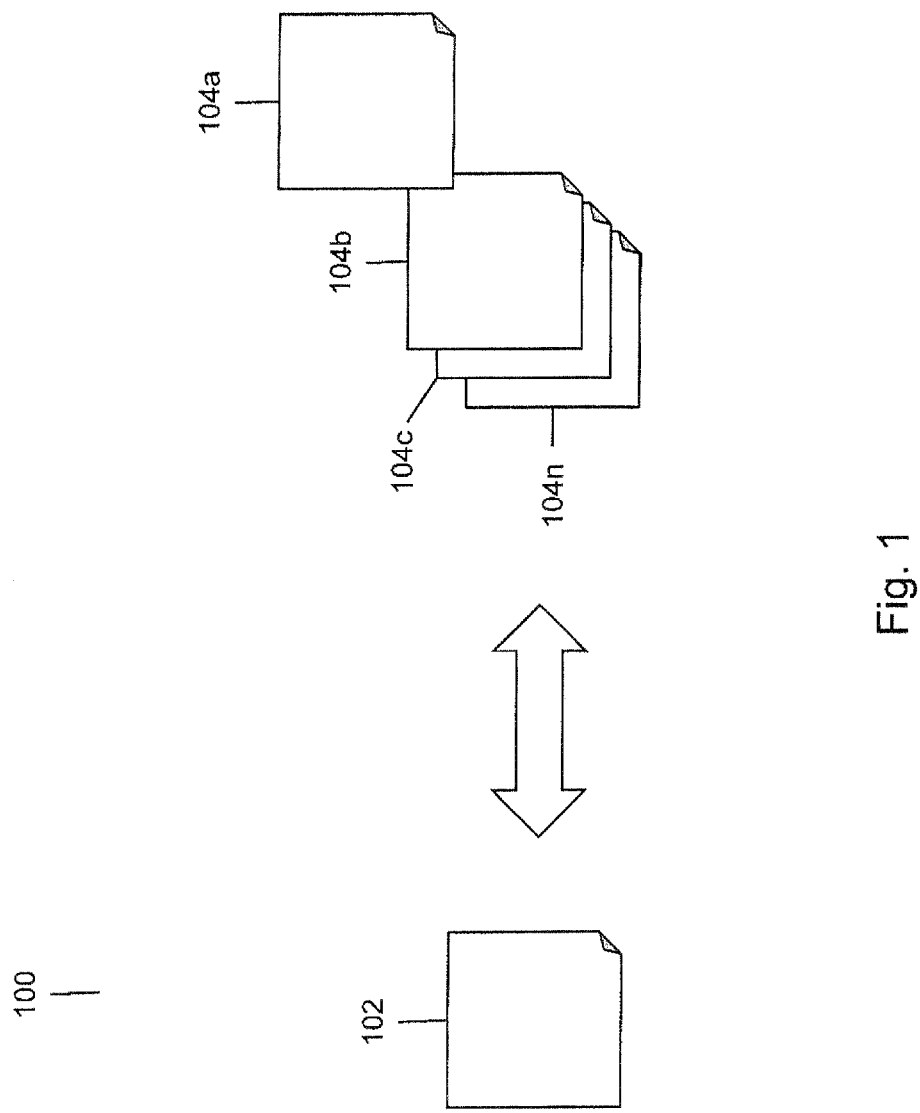
FIG. 1 illustrates an environment of images where various embodiments of the present invention can be practiced.

FIG. 1 illustrates an environment 100, where various embodiments of the present invention can be practiced. The present invention may be used in the field of computer vision, object recognition, motion tracking and 3D modeling. The images may be of different formats such as JPEG, GIF, BMP, and the like. Further, the quality and resolution of these images may vary from one application to another. Also, the images to be matched need not be exactly the same but may be transformed versions of each other. Therefore, the image matching algorithm requires the image to be represented in a particular format so that the images can be matched with each other.

Environment 100 includes a query image 102 and a database of images 104 *a-n*. The database is searched to find an image (or images) that match query image 102. The matching image need not be exactly the same as query image 102, but should contain the same content as query image 102. For example, database 104 could contain a copy of a print ad from a magazine, while query image 102 is an image taken of that same ad. The image matching algorithm of the present invention finds a match of query image 102 in images 104 a-n, which may differ in the manner described above. The image matching algorithm operates by representing each image in terms of feature points and feature vectors. The feature points, orientations and feature vectors of the images are used to determine a match between the images. The present invention describes a method and system for matching images.

Figure 2:
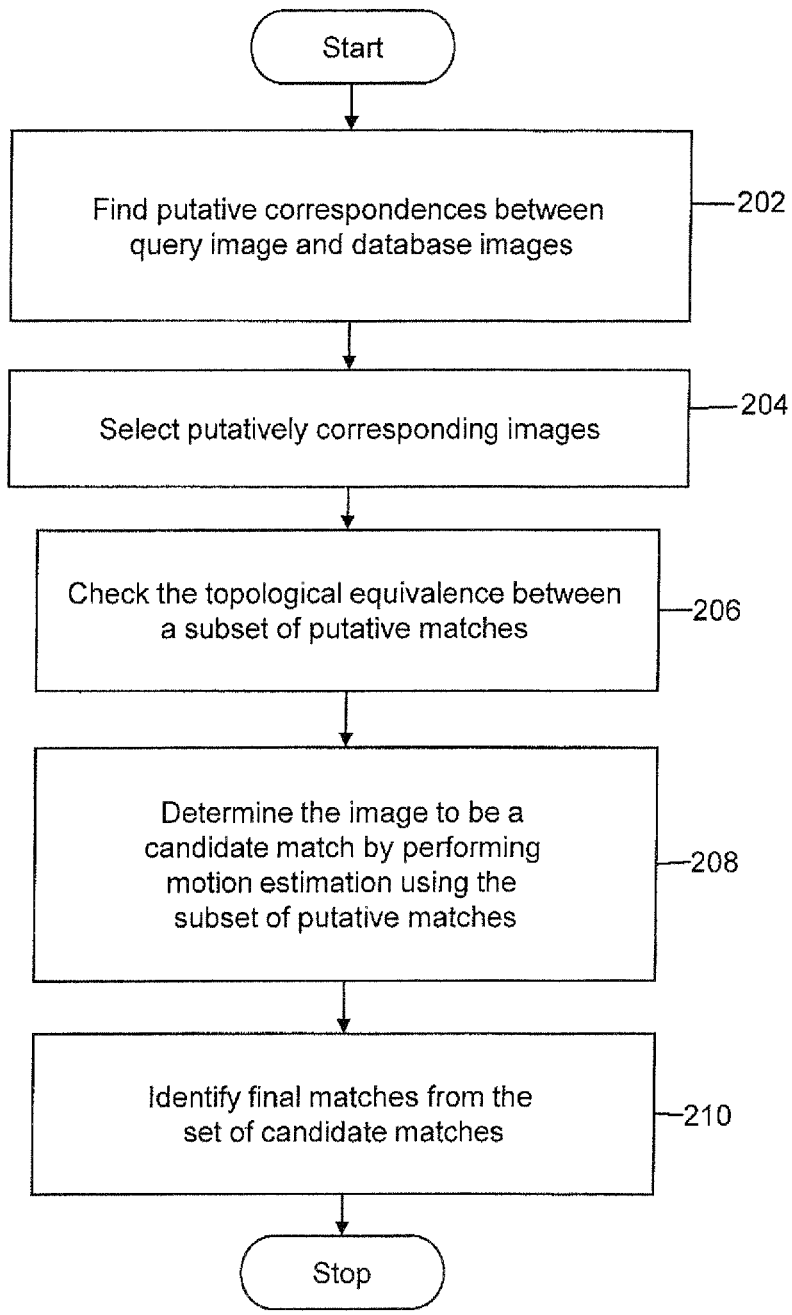
FIG. 2 is a flow diagram illustrating a method of matching images, in accordance with an embodiment of the present invention.

FIG. 2 is a flow diagram illustrating a method for matching images, in accordance with an embodiment of the present invention. FIG. 2 gives a brief overview of the main steps that should preferably be performed on an image for matching the image with another image. Each step of FIG. 2 is later described in detail in conjunction with FIGS. 5, 6 and 7. Before matching the query image with the database image, the feature points and feature vectors associated with the images are determined. The images are matched based on feature points, the orientations of the feature points, and their corresponding feature vectors.

At step 202, putative correspondences are found between the feature points of the query image and database images. Feature vectors associated with their corresponding feature points are used to determine putative correspondences between the images. A putative correspondence is a pair of feature points, one from the query image and one from the database image, that are visually similar to each other. The putative correspondences can be determined by finding dot products between feature vectors of the query image and feature vectors of database images. The pair of feature points is a putative correspondence when the magnitude of the dot product of their feature vectors is greater than a predefined value. When the feature vectors have unit length, the magnitude of the dot product is equal to the cosine of the angle between the feature vectors, and therefore measures their closeness. Thereafter, at step 204 putatively corresponding images are selected based on the putative correspondences between the query image and the database images. More specifically, an image is selected as a putatively corresponding image based on the number of putative correspondences determined in step 202 and the number of putative correspondences found in each of the database images. In other words, a putatively corresponding image should have a sufficient number of putative correspondences when compared with the database images. In one embodiment, putatively corresponding images should have at least 9 putative correspondences. After an image is selected as a putatively corresponding image, a transformation is generated to explain the relative motion between the two images. Further, a subset of corresponding images is used to determine the coefficients of the transformation. At step 206, the subset of putative correspondences is checked for their topological equivalence. The subset of putative correspondences is discarded if it is not topologically equivalent. Two sets of corresponding points are topologically equivalent if, given two lines, one through a pair of points in one set and the other through the corresponding points in the other set, the remaining corresponding points are on the same side of (above or below) each line. This is done to avoid computation with physically invalid transformations. After the topological equivalence of the putative correspondences is checked, motion estimation is performed using this subset of putative correspondences at step 208. In order to perform motion estimation, a transformation mapping feature points in the subset of putative correspondences between the query image and the database image (or vice versa) is determined. The transformation is applied to a feature point of a putative correspondence in the query image, and a transformed point is obtained corresponding to that feature point in the database image. Further, the transformation encodes the relative motion (rotation, scale changes, etc.) between the query image and the database images. Putative correspondences are determined to be inliers when the transformed point is within a predefined limit of the feature point. After the inliers are determined for the database images, final matches are identified at step 210. The final match is the database image whose number of inliers is greater than a predetermined threshold. The total number of inliers corresponds to the number of feature points with both visual and geometric matches between the query image and the database images. In an embodiment of the present invention, the predetermined threshold is 9. Further, the Root Mean Square (RMS) error or approximation error associated with the database image should preferably be less than a predefined threshold. In one embodiment of the present invention, we compute a final transformation over all inliers, compute the squared distance between each point's actual location and expected location, compute the mean of these squared distances, and compare the square root of the mean of the squared distances with the predefined threshold of 5% of the width of the image.

Figure 3:
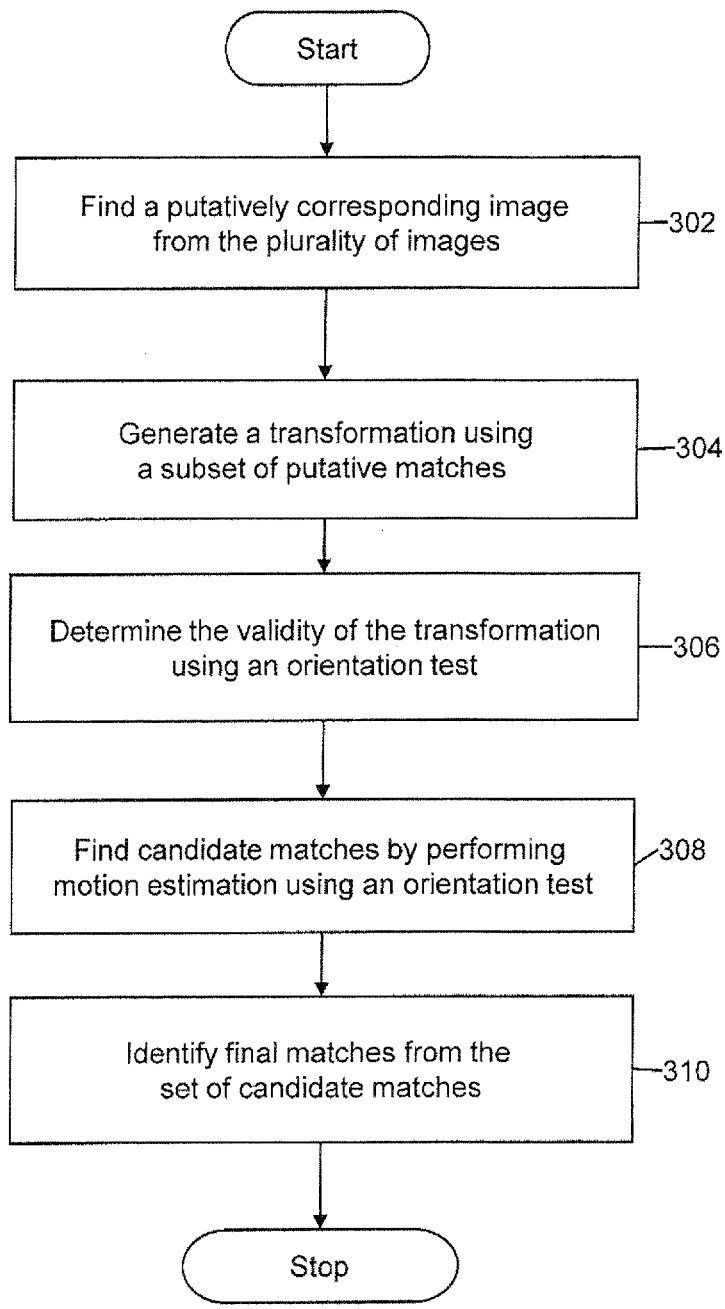
FIG. 3 is a flow diagram illustrating a method of matching images, in accordance with another embodiment of the present invention.

FIG. 3 is a flow diagram illustrating a method for matching images, in accordance with another embodiment of the present invention. FIG. 3 gives a brief overview of the main steps that should preferably be performed on an image for matching the image with another image. Each step of FIG. 3 is later described in detail in conjunction with FIGS. 5, 6 and 7. Further, the invention is not limited by the steps described in the FIG. 3. A person skilled in the art will appreciate and understand that a number of variations in the steps presented in FIG. 3 are possible to enhance the efficiency and accuracy of the image matching algorithm.

At step 302 putative correspondences are determined between the feature points of the query image and database images as described in conjunction with FIG. 2. After determining putatively corresponding images using the putative correspondences, a transformation is generated using a subset of putative correspondences at step 304 as described in conjunction with FIG. 2. If there is inconsistency of orientation in the subset of putative correspondences, the transformation computed at step 304 will be considered as invalid. Hence, for the transformation to be valid, the orientation associated with each feature point should remain within a specific tolerance limit after the transformation is applied on each feature point. To determine the validity of the transformation, an orientation consistency test is performed at step 306. The test is performed on the putative correspondences obtained from step 304. For performing the orientation consistency test, an offset point of the feature point present in the putative correspondence is determined in the direction of the orientation of that feature point. The feature points used in this test either belong to the query image or the database image. Thereafter, the transformation is applied to the offset points and the feature points. The expected orientations of feature points in the images are determined from the transformed points. The transformation is invalid when the expected orientations of the feature offset points differ from the actual orientations of the feature points obtained from step 304 by more than a predefined tolerance limit. The limit must be reasonably large because perspective deformations of an image will not preserve orientation exactly. In an embodiment of the invention a limit of 0.1 radians is used. The expected orientations of the feature offset points are compared with the actual orientations of the feature points obtained from step 304. If one or more of the orientations is outside the limit, the transformation is discarded. Otherwise, motion estimation proceeds in step 308 as described above in conjunction with FIG. 2. While performing motion estimation, the orientation consistency test can be used again on the inliers found by motion estimation. If an inlier does not satisfy the orientation consistency test, it is discarded.

After the orientation consistency of the inliers is determined, final match images are identified at step 310 as described in conjunction with FIG. 2.

Figure 4:
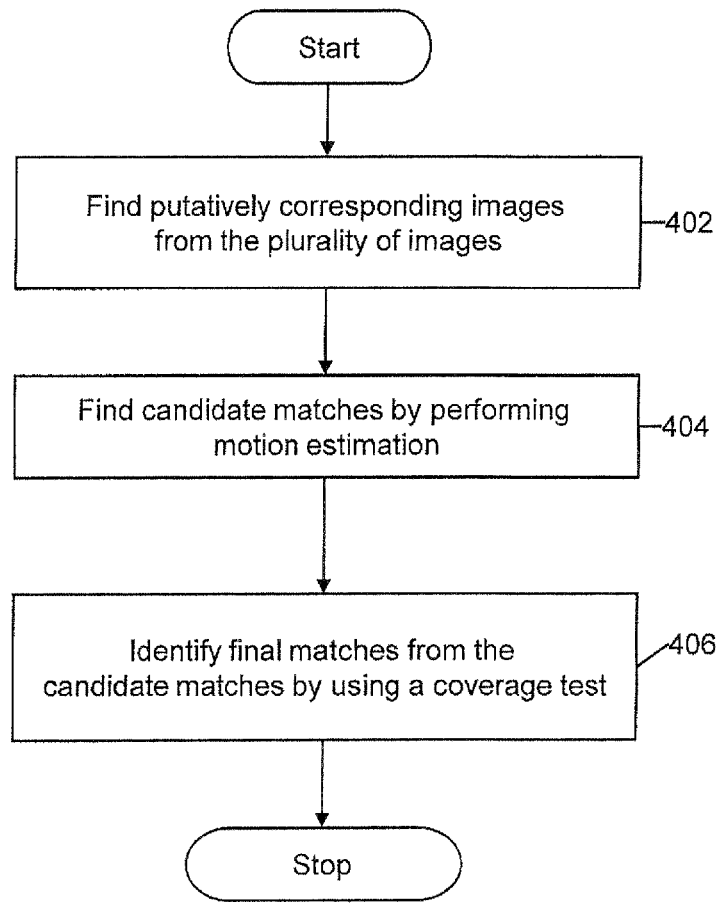
FIG. 4 is a flow diagram illustrating a method of matching images, in accordance with another embodiment of the present invention.

FIG. 4 is a flow diagram illustrating a method for matching images, in accordance with another embodiment of the present invention. FIG. 4 gives a brief overview of the main steps that should preferably be performed on an image for matching the image with another image. Each step of FIG. 4 is later described in detail in conjunction with FIGS. 5, 6 and 7. A person skilled in the art will appreciate and understand that a number of variations in the steps presented in FIG. 4 are possible to enhance the efficiency and accuracy of the image matching algorithm.

At step 402 putatively corresponding images are found based on putative correspondences that are determined between the feature points of the query image and the database images. This step has already been described in detail in conjunction with FIG. 2. After determining the putative correspondences, a subset of putative correspondences is sampled randomly from the putative correspondences. Using this subset of putative correspondences, motion estimation is performed at step 404 as described in conjunction with FIG. 2. The motion estimation is performed on putative correspondences determined from step 402 to determine the set of inliers. After performing motion estimation, coverage of the database images is determined at step 406. The coverage test determines the coverage of inliers of the database image. In the coverage test, the ratio of area of the inliers to the area of the image is determined for both the query image and the database image. In one embodiment of the present invention, the area of the inliers is the area of the polygon formed by the convex hull of the inliers. The convex hull is the smallest polygon that encloses all the inliers. In another embodiment of the present invention, the area of the inliers is the area of the smallest axis-aligned bounding rectangle that encloses all the inliers. Such a rectangle should have a side that is parallel (horizontally or vertically) to the boundary of the image. The database image is rejected when the maximum of the two ratios is less than a predefined threshold. The coverage test is performed to determine that the entire database image is being matched to the query image, instead of just a common element present in the images being compared. After the coverage test is performed, final match images are identified at step 406 as described in conjunction with FIG. 2.

Figure 5:
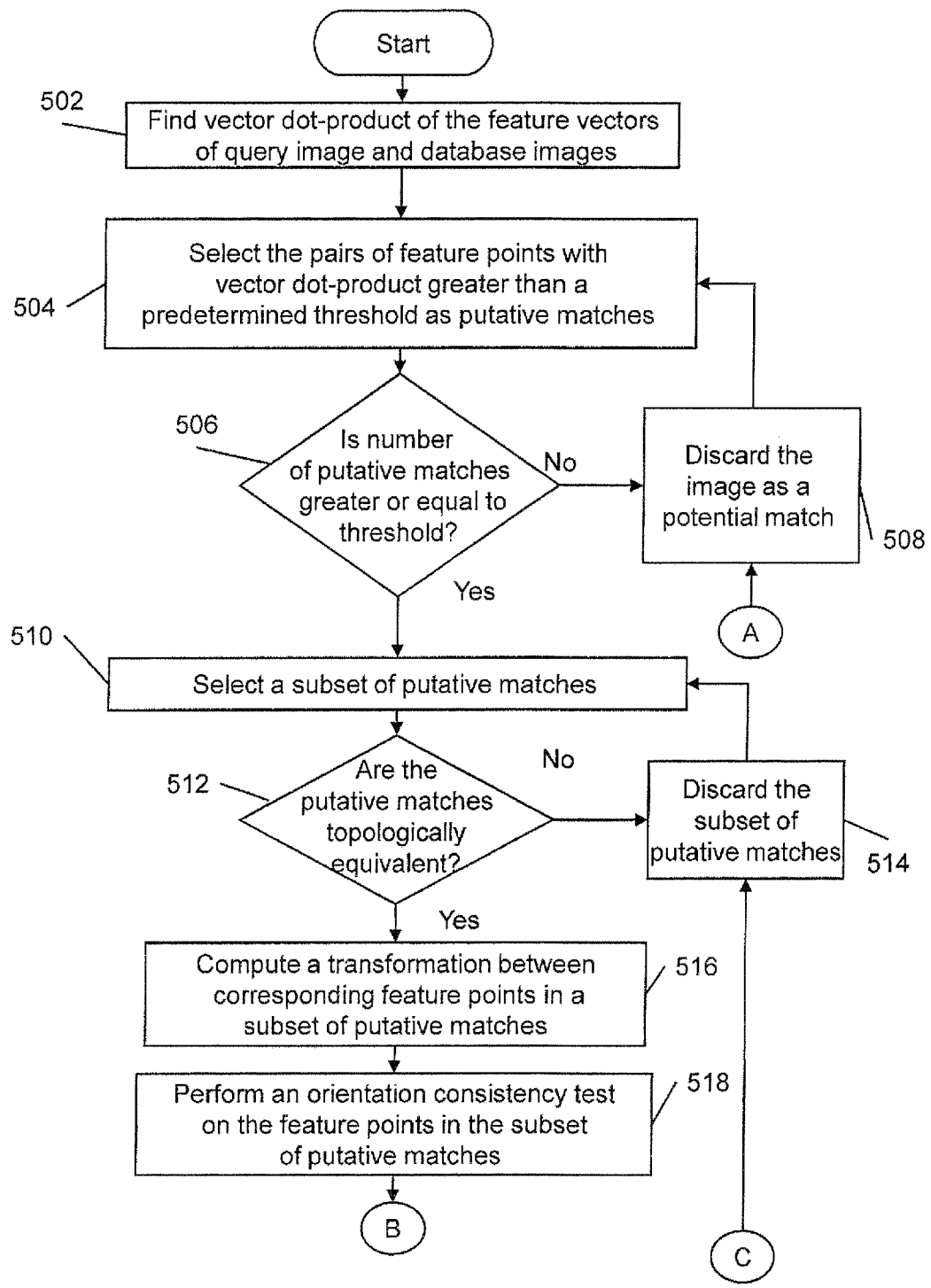
FIGS. 5, 6 and 7 is a flow diagram depicting a detailed method of matching images, in accordance with an embodiment of the present invention.
Figure 6:
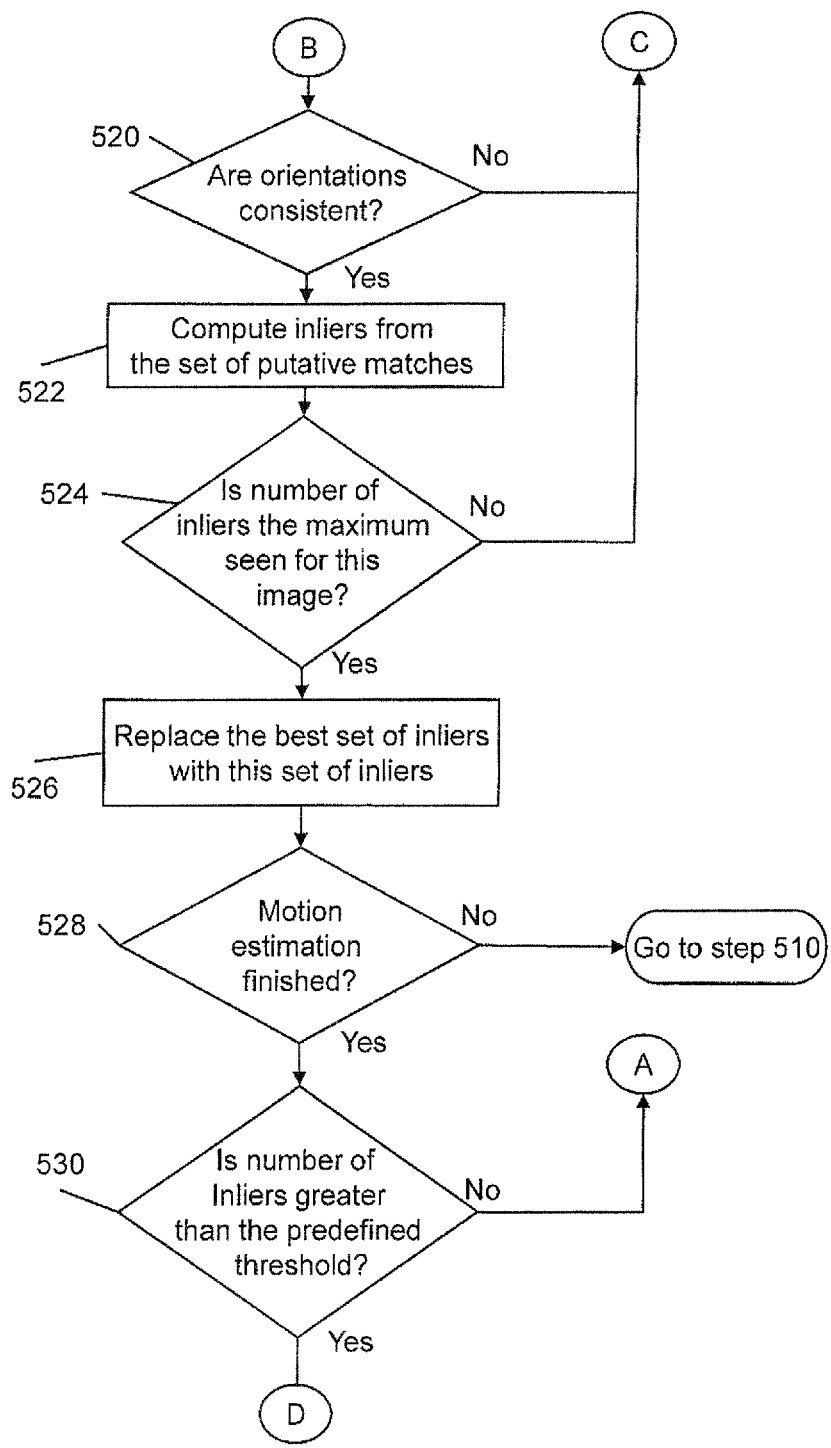
Figure 7:
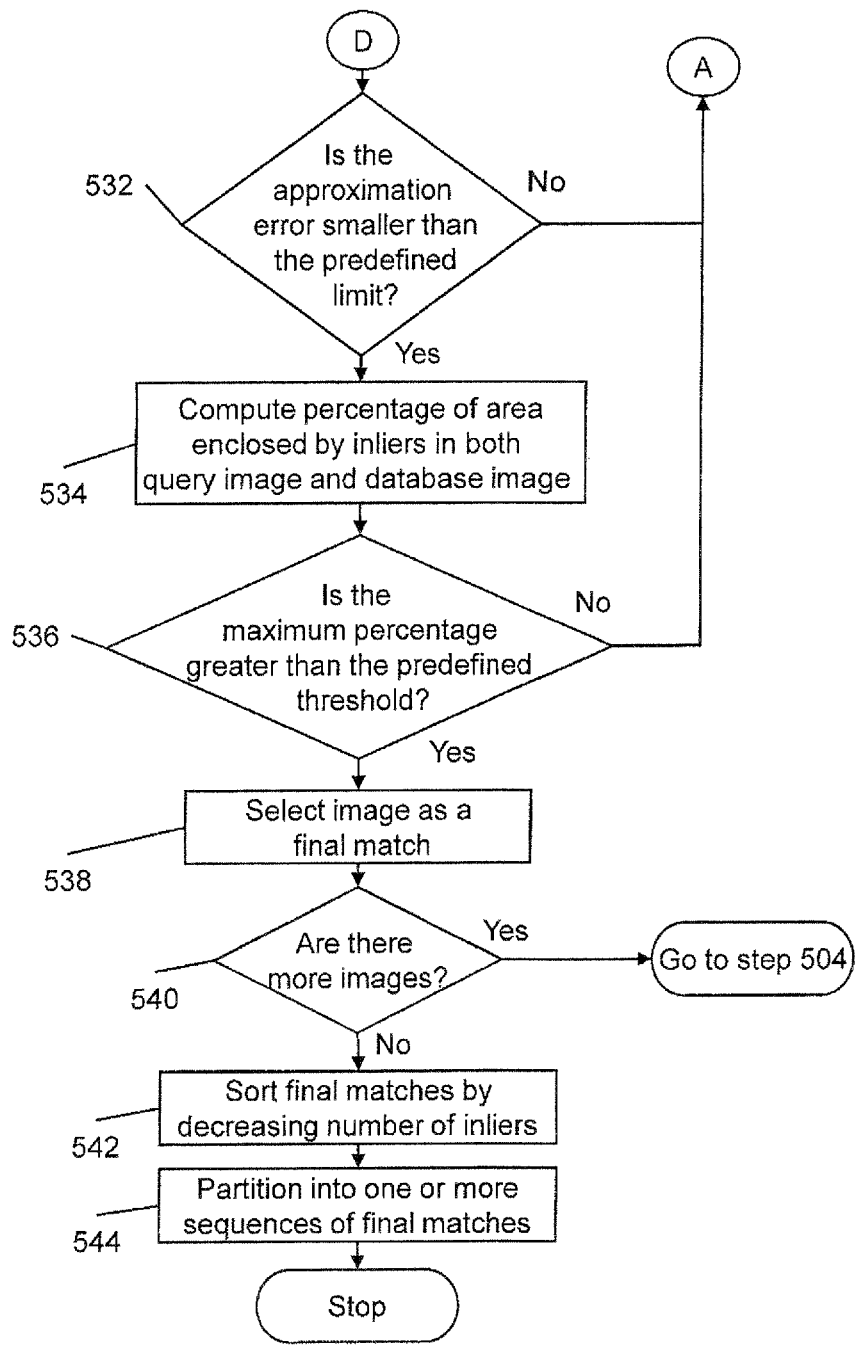

FIGS. 5, 6 and 7 depict a flow diagram that illustrates a detailed method for matching of images. To match the query image with other images, the images are represented in the form of feature points, the orientations of the feature points, and the corresponding feature vectors. Such a representation can be compared across images to find matching images. The method for image matching is performed independently between the query image and the database images. However, to reduce ambiguity, the following description of the image matching algorithm is explained considering a single database image.

In order to match the two images, the putative correspondences between the query image and the database image are identified. Putative correspondences are a pair of feature points in the query image and the database image that are visually similar to each other.

In step 502, dot products are computed between the feature vectors of the query image and the feature vectors of the database images. Computing the dot product for the feature vectors in the query image and the database image can be done by multiplying two matrices, one whose rows correspond to the feature vectors of one image and the other whose columns correspond to the feature vectors of the other image. Dot products are a fast approximation to the Euclidean distance between unit vectors.

At step 504, dot products greater than a predefined magnitude indicate which pairs of feature vectors are putative correspondences. In one embodiment of the present invention, the predefined magnitude is 0.93. A feature vector of one image may be involved in multiple putative correspondences. A possible reason for this phenomenon is that the feature point corresponding to that feature vector is generic, such as a 90-degree white corner on a black background. If a feature vector is involved in too many putative correspondences, it can decrease the ability to perform motion estimation because at most one of those putative correspondences is correct. This is because the RANSAC algorithm (motion estimation algorithm) relies on a certain percentage of the correspondences to be inliers, and if the actual percentage of correspondences is low it becomes extremely difficult to randomly select a subset consisting only of inliers. In one embodiment of the present invention, feature vectors involved in more than 6 putative correspondences are eliminated from consideration.

At step 506, a check is performed on the number of putative correspondences of the database images. The number of putative correspondences is compared with a predefined threshold. If the number of putative correspondences of a database image is less than a predefined threshold, the database image is discarded at step 508. The threshold should preferably be at least the greater of the number of putative correspondences used for the subset chosen in step 510 and the number of inliers required to be confident of a match in step 524. The threshold may also be dependent on the number of putative correspondences found in other database images to avoid computation on images that are unlikely to be a match for the query image. This step ensures that computationally expensive motion estimation is not performed on images that have fewer correspondences than many other images.

After determining the putative correspondences and deciding which images to pursue, motion estimation is performed on these putatively matching images. In the process of motion estimation, a geometric transformation is generated. The feature points of the query image are mapped to feature points of the database image based on the transformation. The transformation chosen for the present invention is a homography. A homography is a transformation that encodes rotation, scaling and foreshortening of the query image. The description of motion estimation between the query image and the database image is provided in steps 510 through 516.

At step 510, a subset of putative correspondences is randomly selected from the putative correspondences obtained from step 506. In an embodiment of the present invention, the subset may contain four putative correspondences that are sampled randomly because a minimum of four putative correspondences is necessary to generate a homography.

At step 512, a topological equivalence test is performed on the subset of putative correspondences. Two sets of points are topologically equivalent if for any ray drawn from any point through any other point in both sets, the remaining points are either on the left side of the ray or on the right side of the ray.

As a first step in conducting a topological equivalence test, two feature points in one of the images are connected with a straight line, as are the corresponding points in the other image. Another correspondence is chosen, and the signed distance from the feature point in the query image to the line in the query image is computed. A similar computation is done for the database image. If the two signs are different, the subset of putative correspondences is not topologically equivalent. If the two signs are the same, another correspondence is tested. However, a corner case can occur when two corresponding points lie on their respective lines or are very close to them. In that case a test is performed to determine the order of the three points (the two points that generated the line plus the point being tested) with respect to the line. The corresponding points are topologically equivalent if the points have the same order with respect to the line. If the subset of putative correspondences fails the topological equivalence test, a physically invalid transformation results, and therefore it is discarded in step 514 and a new subset of putative correspondences is selected in step 510.

When the subset of putative correspondences passes the topological equivalence test, the motion estimation is performed at step 516 on the subset of putative correspondences obtained from step 510. The process of motion estimation generates a transformation. This transformation is used to map the feature points of the query image to the feature points of the database image. The transformation chosen for the present invention is a homography. A person skilled in the art would appreciate that transformations other than homograph), can also be used to conduct motion estimation. For example, affine transformations, which can be generated from a sample set of three putative correspondences, can be used for motion estimation.

The putative correspondences in the subset of putative correspondences are normalized to have their centroid at (0, 0) and mean distance of $\sqrt{2}$ from the origin. These points are homogeneous and have the form [x y w], where w=1. This is done to make the computations numerically stable by eliminating the computations required for one degree of freedom. After the putative correspondences are normalized, two constraints are created from a putative correspondence. These constraints are represented as two rows of a matrix:

$$\begin{bmatrix} 0 & 0 & 0 & -w_2 P_1 & y_2 P_1 \\ w_2 P_1 & 0 & 0 & 0 & x_2 P_1 \end{bmatrix},$$

where $P_1 = [x_1\ y_1\ w_1]$ and $P_2 = [x_2\ y_2\ w_2]$ are two points in a putative correspondence. The four putative correspondences create an 8×9 matrix. The last right singular vector of the singular value decomposition (SVD) of this matrix is the coefficients of the homography in row-major order. These coefficients will map the four feature points in one image to the feature points in the other image.

The homography determined at step 516 might be topologically valid, but orientation constraints imposed by the feature points might make it infeasible. For the homography to be feasible, the orientation associated with each feature point should remain within a specific tolerance limit after the homography has been applied to each feature point. To determine the feasibility of the homography, an orientation consistency test is performed at step 518. The test is performed on the putative correspondences obtained from step 510. In the orientation consistency test, an offset point of the feature point from one of the images in the subset of putative correspondences is determined in the direction of the orientation of that feature point. Thereafter, the homography is applied to these offset points. The expected orientations of the feature points in the image are obtained from the displacement between the feature points in the other image and their corresponding transformed offset points. The homography is infeasible when the expected orientations of the feature points, obtained after applying the homography, differ from the actual orientations of the feature points by more than a predefined tolerance limit. In such a case, the subset of putative correspondences is discarded at step 514 and a new subset is selected at step 510. In one embodiment, the predefined tolerance limit is 0.1 radians. A large limit is necessary because the orientation test does not account well for perspective distortion between the query image and the database image.

At step 520, the orientations of the feature points obtained from the offset of points are compared with the orientation of the feature points obtained from step 518. If the orientations of the feature points, after applying the transformation, do not remain consistent, the homography is considered to be infeasible. In such a case, the subset of putative correspondences is discarded at step 514 and a new subset of putative correspondences is selected at step 510 to generate a new transformation.

Inliers are computed from the feature points of the putative correspondences in the query image and the database image at step 522. Inliers are putative correspondences which map to each other through the homography. The number of inliers is a measure of matching between the two images. Before computing the inliers, a condition number of the homography is determined. In theory, it is required only that the homography, which is a 3×3 matrix, have rank 3. However, for numerical stability of the algorithm, the stronger constraint of being a well-conditioned matrix is desirable. The condition number, which is the ratio of the largest singular value to the smallest singular value, should be below $10^7$. Thereafter, a putative correspondence is determined as a potential inlier when the distance between the actual feature points and their expected values under the homography of each image is within a predefined limit. If $p_1$ and $p_2$ are a pair of corresponding feature points, the transformation H is applied in both the forward and reverse directions to determine the expected feature point locations $Hp_1$ and $H^{-1}p_2$. These expected feature points are renormalized to have their w component as 1. Thereafter, the $L_2$-squared norms of $Hp_1 - p_2$ and of $p_1 - H^{-1}p_2$ are computed. If the sum of these differences is less than a predefined threshold, the putative correspondence $p_1$ and $p_2$ are potential inliers. In an embodiment of the present invention, the predefined threshold is 0.01.

After the potential inliers are determined, the orientation consistency test described earlier is performed on the potential inliers. The potential inliers that do not satisfy the orientation consistency test are discarded and the remaining inliers are determined as inliers for the database image. These inliers are used to compute a final homography using a least-square fit. This homography is used to map the points between the pair of images, and the Root Mean Square (RMS) error or approximation error associated with the database image is determined.

After establishing the inliers, a comparison is made between the total number of inliers found for this transformation and the total number of inliers in the transformation for the database image at step 524. If this transformation has more inliers than the best found so far, this transformation and its inliers are retained according to step 526. Otherwise it is discarded and a new subset of putative correspondences is chosen at step 510.

At step 528 a decision is made as to whether to continue the motion estimation phase. If a sufficient number of trials have been made, the algorithm moves on. In an embodiment of the invention, 500 trials are used. Alternately, if the number of inliers in the best transformation found so far is a high enough percentage of the number of putative correspondences, the statistical algorithm may decide that it is unlikely that a better transformation will be found, in which case the motion estimation phase terminates early.

The database image is selected as a potential match at step 530 when the number of inliers associated with the image is greater than a predefined threshold. The predefined threshold can be 8 inliers. Thereafter, the Root Mean Square (RMS) error or approximation error for the potential match is checked at step 532. If the RMS error is equal to or more than a predefined limit, the process goes back to step 508 and the database image is discarded. In one embodiment of the present invention, the predefined RMS error limit can be 2.5% of the width of the database image.

However, if the RMS error or approximation error of the potential match is less than the predefined limit, then the coverage of the inliers of the potential match is computed at step 534. In the coverage test, the percentage of area enclosed by inliers of both the database and the query image is measured. The coverage test is used to avoid situations where only a small part of the image, e.g. a logo or text having same font, is shared between the query and database images. Coverage is defined as the ratio of the area enclosed by the set of inliers to the area of the image. Several embodiments can be employed to compute a polygon that encloses the set of inliers. In one embodiment, the minimum and maximum x- and y-coordinates are used to form a bounding rectangle. In another embodiment, the convex hull of the inliers is computed. If the areas of the polygons enclosing the inliers of the query image and database image are denoted respectively as $A_{pq}$ and $A_{pd}$, and the areas of the query image and the database image are denoted respectively as $A_q$ and $A_d$, the coverage C can be defined as:

$$C = \max \frac{A_{pq}}{A_q}, \frac{A_{pd}}{A_d}.$$

The coverage C should preferably be greater above than a predefined threshold to ascertain that the entire image is being matched instead of just a part of the image. At step 536, the coverage is compared with the predefined coverage threshold. In an embodiment of the present invention, the predefined coverage threshold can be 0.3.

At step 538, candidate database images that pass all of the above tests become final matches. At step 540, it is checked if there are any more database images. If there are some images remaining, then the same procedure is repeated starting from step 504. There can be a case that more than one image satisfy all the requirements to be determined as a final match. In that case the final matches are sorted at step 542 in decreasing order of the number of inliers.

At step 544, the sorted list of final matches from step 542 is partitioned to address the case where the query image contains multiple database images. We examine the final match and compare the polygon enclosing its inliers with the polygons enclosing the inliers of the head (first element) of the existing sequence of the sorted list of final matches. If the ratio of the area of the intersection of the final match polygon and the sequence head polygon to the area of the smaller of the two polygons is greater than a predefined threshold, the two matches are deemed to overlap substantially, and the final match is appended to the sequence. If the final match polygon does not overlap substantially with any sequence head polygon, the final match becomes the head of a new sequence. In this manner multiple image matches occupying disjoint regions of the image can be reported, along with their locations. If only one match can be returned to the end user, the head of the sequence closest to the center of the image could be used.

Figure 8:
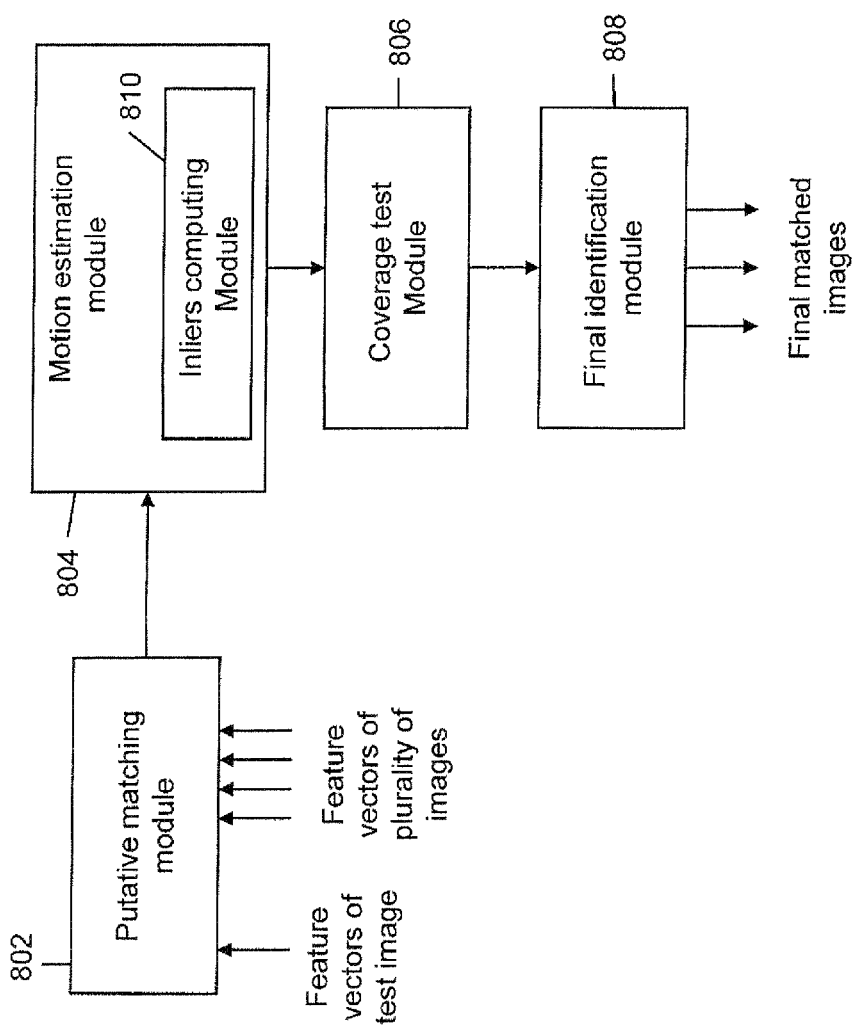
FIG. 8 is a block diagram illustrating a system that can be used for matching images, in accordance with various embodiments of the present invention.

FIG. 8 is a block diagram that illustrates the elements of the system used to match the image, in accordance with various embodiments of the present invention. The system takes feature representations of the query image and a plurality of database images as input, and outputs the final matched images in decreasing order of the number of inliers each final matched image contains. FIG. 8 includes Putative Matching Module (PMM) 802, Motion Estimation Module (MEM) 804, Coverage Test Module (CTM) 806 and Final Identification Module (FIM) 808.

PMM 802 is configured to find features in the query image that are visually similar to features in a database image. PMM 802 computes dot products between the feature vectors of a query image and the feature vectors of database images. Also, PMM 802 compares the dot products with a predefined value and outputs pairs of feature points whose dot products are greater than a predefined value as putative correspondences. These putative correspondences are input to MEM 804.

MEM 804 determines the set of database images that are geometrically consistent out of the set of database images that have sufficient putative correspondences. This module randomly samples subsets of putative correspondences to generate a transformation. MEM 804 is also configured to perform a topological equivalence test on the subset of putative correspondences to determine the topological equivalence between each putative correspondence of the subset of putative correspondences. Further, MEM 804 is configured to determine a transformation using the subset of putative matches that pass the topological equivalence test, MEM 804 tests the transformation for orientation consistency on the subset of putative correspondences and then on the feature points that match under the transformation. MEM 804 is configured to output the resulting inliers for each database image with sufficient number of inliers greater than a predefined threshold and with RMS error or approximation error less than the predefined limit. Specifically, this task is performed by Inliers Computing Module (ICM) 810. ICM 810 computes inliers from the set of putative correspondences between the query image and a putatively corresponding image using the transformation. MEM 804 outputs the resulting inliers as input to CTM 806, which performs the coverage test on the database images. Thereafter, the database images which satisfy the coverage test are given as input to FIM 808. FIM 808 sorts the final matches in decreasing order of number of inliers contained by each final match. Further, FIM 808 is configured to partition the final matches into one or more sequences and provide the sequence(s) as output.

In accordance with various embodiments of the present invention, the present invention provides a method for effectively matching images. The present invention efficiently matches an image with one or more images, while reducing the unnecessary computations that may occur, The method uses a set of tests to remove impossible or infeasible transformations from being tested, which can lead to incorrect images being matched or wasted computation.

Also, features that have a spuriously large number of matches are discarded, as these features are very common across the image and are not contributing towards a true image match. A coverage test is performed to make sure that features being matched cover a significant area of either the query image or the database image and are not just a small part of the image. A query image that contains multiple database images can be dealt with effectively.

The system for matching of images, as described in the present invention or any of its components, may be embodied in the form of a computer program product for use with a computer system. The computer program product has a computer-usable medium having a computer-readable code embodied therein to match the image. Typical examples of a computer system include a general-purpose computer, a programmed microprocessor, a micro-controller, a peripheral integrated circuit element, and other devices or arrangements of devices capable of implementing the steps that constitute the method of the present invention.

The computer system typically comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as a floppy disk drive, an optical disk drive, and the like. The storage device may also be other similar means of loading computer programs or other instructions into the computer system. The computer system also includes a communication unit. The communication unit enables the computer to connect to other databases and the Internet through an Input/Output (I/O) interface, enabling transfer and reception of data from other databases. The communication unit may include a modem, an Ethernet card or any other similar device which enables the computer system to connect to databases and networks such as LAN, MAN, WAN and the Internet. The computer system facilitates inputs from a user through an input device, accessible to the system through an I/O interface.

The computer system executes a set of instructions stored in one or more storage elements to process input data. The storage elements may also hold data or other information as desired. The storage element may be in the form of an information source or a physical memory element present in the processing machine.

The programmable instructions may include various commands that instruct the processing machine to perform specific tasks such as the steps that constitute the method of the present invention. The method and systems described can also be implemented using only software programming or hardware or by a varying combination of the two techniques. The present invention is independent of the programming language used and the operating system in the computers. The instructions for the invention can be written in all programming languages including, but not limited to, 'C++', 'Visual C++' and 'Visual Basic'. Further, the software may be in the form of a collection of separate programs, a program module with a large program or a portion of a program module, as described in the present invention. The software may also include modular programming in the form of object-oriented programming. The processing of input data by the processing machine may be in response to user commands, results of previous processing or a request made by another processing machine. The invention can also be implemented in all operating systems and platforms including, but not limited to, 'Unix', 'DOS', and 'Linux'.

The programmable instructions can be stored and transmitted on computer-readable medium. The programmable instructions can also be transmitted by data signals across a carrier wave. The present invention can also be embodied in a computer program product comprising a computer-readable medium, the product capable of implementing the methods and systems above or the numerous possible variations thereof.

While various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer-implemented method for matching an image to one or more of a plurality of images, comprising:
under control of one or more computer systems configured with executable instructions,
determining one or more of a plurality of images putatively corresponding to a first image, each putatively corresponding image having a plurality of putative correspondences with the first image;
for each putatively corresponding image and for each transformation of one or more transformations corresponding to one or more subsets of the plurality of putative correspondences between the first image and the putatively corresponding image, performing an orientation consistency test on the transformation to determine validity of the transformation; and
determining one or more matching images from the one or more of the plurality of images putatively corresponding to the first image based at least in part upon performing motion estimation using at least one of the one or more transformations determined to be valid according to the orientation consistency test.

2. The computer-implemented method of claim 1, further comprising:
for each putatively corresponding image, performing a topological equivalence test on each subset of the one or more subsets of the plurality of putative correspondences between the first image and the putatively corresponding image to determine validity of the subset,
wherein performing the orientation consistency on each transformation of the one or more transformations corresponding to the one or more subsets of the plurality of putative correspondences includes performing the orientation consistency on each subset determined to be valid according to the topological equivalence test.

3. The computer-implemented method of claim 1, further comprising:
performing a coverage test for each putatively corresponding image,
wherein determining the one or matching images includes determining that a first coverage of the putatively corresponding image with respect to a second coverage of the first image meets a predefined threshold.

4. The computer-implemented method of claim 1, wherein performing the orientation consistency test on each transformation of the one or more transformation comprises:
for each feature point and putatively corresponding feature point in one of the one or more subsets of the plurality of putative correspondences corresponding to the transformation,
determining a first offset point by displacing the feature point from the putatively corresponding feature point in a direction of an orientation of the feature point;
applying the transformation to the first offset point to generate a second offset point; and determining the transformation to be valid when an orientation of the corresponding feature point and an orientation of the second offset point are within a predefined tolerance limit.

5. The computer-implemented method of claim 4, wherein the predefined tolerance limit is less than or equal to 0.1 radians.

6. The computer-implemented method of claim 1, wherein determining the one or more of the plurality of images putatively corresponding to the first image comprises:
   determining first feature points of the first image; and
   for each second image of the plurality of images,
      determining second feature points of the second image;
      determining that a first feature point of the first image and a second feature point of the second image comprise a putative correspondence when the first feature point and the second feature point are determined to be visually similar; and
      determining that the second image comprises one of the one or more of the plurality of images putatively corresponding to the first image when a number of putative correspondences between the first image and the second images meets a specified threshold.

7. The computer-implemented method of claim 1, wherein determining the one or matching images from the one or more of the plurality of images putatively corresponding to the first image comprises:
   for each putatively corresponding image,
      for each transformation of the at least one of the one or more transformations determined to be valid according to the orientation consistency test,
         determining a number of inliers using the transformation and the plurality of putative correspondences between the first image and the putatively corresponding image; and
         retaining the transformation as a best transformation based on the number of inliers of the transformation being greater than a number of inliers of a current best transformation; and
      determining the putatively corresponding image comprises one of the one or more matching images when the number of inliers of the best transformation meets a specified threshold.

8. The computer-implemented method of claim 1, wherein determining the one or more matching images includes:
   selecting one of the one or more matching images when a number of inliers for the one of the one or more matching images is greater than a predefined number of inliers and has an approximation error less than a predefined threshold.

9. A computer-implemented method for matching a query image to one or more of a plurality of database images, comprising:
   under control of one or more computer systems configured with executable instructions,
      obtaining a request to match a query image to one or more of a plurality of database images;
      determining one or more of the plurality of database images putatively corresponding to the query image, each putatively corresponding database image having a plurality of putative correspondences with the query image;
      for each putatively corresponding database image and for each transformation of one or more transformations corresponding to one or more subsets of the plurality of putative correspondences between the query image and the putatively corresponding database image, performing an orientation consistency test on the transformation to determine validity of the transformation;
      determining one or more matching images from the one or more of the plurality of database images putatively corresponding to query image based at least in part upon performing motion estimation using at least one of the one or more transformations determined to be valid according to the orientation consistency test; and
      providing at least one of the one or more matching images in response to the request.

10. The computer-implemented method of claim 9, further comprising:
   for each putatively corresponding database image, performing a topological equivalence test on each subset of the one or more subsets of the plurality of putative correspondences between the query image and the putatively corresponding database image to determine validity of the subset,
   wherein performing the orientation consistency on each transformation of the one or more transformations corresponding to the one or more subsets of the plurality of putative correspondences includes performing the orientation consistency on each subset determined to be valid according to the topological equivalence test.

11. The computer-implemented method of claim 9, further comprising:
   performing a coverage test for each putatively corresponding database image,
   wherein determining the one or matching images includes determining that a first coverage of the putatively corresponding database image with respect to a second coverage of the query image meets a predefined threshold.

12. The computer-implemented method of claim 9, wherein performing the orientation consistency test on each transformation of the one or more transformation comprises:
   for each feature point and putatively corresponding feature point in one of the one or more subsets of the plurality of putative correspondences corresponding to the transformation,
      determining a first offset point by displacing the feature point from the putatively corresponding feature point in a direction of an orientation of the feature point;
      applying the transformation to the first offset point to generate a second offset point; and
      determining the transformation to be valid when an orientation of the corresponding feature point and an orientation of the second offset point are within a predefined tolerance limit.

13. The computer-implemented method of claim 9, wherein determining the one or more of the plurality of database images putatively corresponding to the query image comprises:
   determining first feature points of the query image; and
   for each database image of the plurality of database images,
      determining second feature points of the database image;
      determining that a first feature point of the query image and a second feature point of the database image comprise a putative correspondence when the first feature point and the second feature point are determined to be visually similar; and
      determining the database image comprises one of the one or more of the plurality of putatively corresponding database images when a number of putative correspondences between the query image and the database image meets a specified threshold.

14. The computer-implemented method of claim 9, wherein determining the one or matching images from the one or more of the plurality of database images putatively corresponding to the query image comprises:
for each putatively corresponding database image,
for each transformation of the at least one of the one or more transformations determined to be valid according to the orientation consistency test,
determining a number of inliers using the transformation and the plurality of putative correspondences between the query image and the putatively corresponding database image; and
retaining the transformation as a best transformation based on the number of inliers of the transformation being greater than a number of inliers of a current best transformation; and
determining the putatively corresponding database image comprises one of the one or more matching images when the number of inliers of the best transformation meets a specified threshold.

15. A computer-implemented method for matching a query image to one or more of a plurality of database images, comprising:
under control of one or more computer systems configured with executable instructions,
obtaining a request to match a query image to one or more of a plurality of database images;
determining a plurality of feature points, a plurality of orientations, and a plurality of feature vectors for the query image, each of the plurality of feature points corresponding to one of the plurality of orientations and one of the plurality of feature vectors;
determining one or more of the plurality of database images putatively corresponding to the query image, a database image of the plurality of database images putatively corresponding to the query image when a number of putative correspondences between the database image and the query image meets a first specified threshold, the putative correspondences comprising a portion of the plurality of feature points of the query image and a portion of a plurality of putatively corresponding feature points of the database image being determined to be visually similar;
for each database image putatively corresponding to the query image,
generating one or more transformation corresponding to one or more subsets of the putative correspondences between the database image and the query image;
performing an orientation consistency test to determine validity of each of the one or more transformations;
performing motion estimation using at least one of the one or more transformations determined to be valid according to the orientation consistency test; and
determining whether the database image matches the query image based at least in part upon the motion estimation using the at least one of the one or more transformations resulting in a number of inliers meeting a second specified threshold, the inliers comprising the putative correspondences fitting the at least one of the one or more transformations; and
providing at least one database image determined to match the query image in response to the request.

16. The computer-implemented method of claim 15, wherein performing the orientation consistency test to determine the validity of each of the one or more transformation comprises:
for each feature point and putatively corresponding feature point in the one or more subsets of the putative correspondences,
determining a first offset point by displacing the feature point from the putatively corresponding feature point in a direction of an orientation of the feature point;
applying one of the one or more transformations to the first offset point to generate a second offset point; and
determining the one of the one or more transformations to be valid when an orientation of the corresponding feature point and an orientation of the second offset point are within a predefined tolerance limit.

17. The computer-implemented method of claim 16, wherein the predefined tolerance limit is less than or equal to 0.1 radians.

18. A system for matching a query image to one or more of a plurality of databases images, comprising:
at least one processor; and
a memory device including instructions that, when executed by the at least one processor, cause the system to:
obtain a request to match a query image to one or more of a plurality of database images;
determine one or more of the plurality of database images putatively corresponding to the query image, each putatively corresponding database image having a plurality of putative correspondences with the query image;
for each putatively corresponding database image and for each transformation of one or more transformations corresponding to one or more subsets of the plurality of putative correspondences between the query image and the putatively corresponding database image, perform an orientation consistency test on the transformation to determine validity of the transformation;
determine one or more matching images from the one or more of the plurality of database images putatively corresponding to query image based at least in part upon performing motion estimation using at least one of the one or more transformations determined to be valid according to the orientation consistency test; and
provide at least one of the one or more matching images in response to the request.

19. The system of claim 18, wherein the instructions when executed further cause the system to:
for each putatively corresponding database image, perform a topological equivalence test on each subset of the one or more subsets of the plurality of putative correspondences between the query image and the putatively corresponding database image to determine validity of the subset,
wherein the instructions to cause the system to perform the orientation consistency on each transformation of the one or more transformations corresponding to the one or more subsets of the plurality of putative correspondences includes instructions to cause the system to perform the orientation consistency on each subset determined to be valid according to the topological equivalence test.

20. The system of claim 18, wherein the instructions to cause the system to perform the consistency test on each transformation of the one or more transformation comprise instructions to cause the system to:
for each feature point and putatively corresponding feature point in one of the one or more subsets of the plurality of putative correspondences corresponding to the transformation,
determine a first offset point by displacing the feature point from the putatively corresponding feature point in a direction of an orientation of the feature point;
apply the transformation to the first offset point to generate a second offset point; and
determine the transformation to be valid when an orientation of the corresponding feature point and an orientation of the second offset point are within a predefined tolerance limit.

21. The system of claim 18, wherein the instructions to cause the system to determine the one or more of the plurality of database images putatively corresponding to the query image comprise instructions to cause the system to:
determine first feature points of the query image; and
for each database image of the plurality of database images,
determine second feature points of the database image;
determine that a first feature point of the query image and a second feature point of the database image comprise a putative correspondence when the first feature point and the second feature point are determined to be visually similar; and
determine the database image comprises one of the one or more of the plurality of putatively corresponding database images when a number of putative correspondences between the query image and the database image meets a specified threshold.

22. A non-transitory computer-readable storage medium for matching an image to one or more of a plurality of images including instructions that, when executed by at least one processor of a computing device, cause the computing device to:
determine one or more of a plurality of images putatively corresponding to a first image, each putatively corresponding image having a plurality of putative correspondences with the first image;
for each putatively corresponding image and for each transformation of one or more transformations corresponding to one or more subsets of the plurality of putative correspondences between the first image and the putatively corresponding image, perform an orientation consistency test on the transformation to determine validity of the transformation; and
determine one or more matching images from the one or more of the plurality of images putatively corresponding to the first image based at least in part upon performing motion estimation using at least one of the one or more transformations determined to be valid according to the orientation consistency test.

23. The non-transitory computer-readable storage medium of claim 22, wherein the instructions when executed further cause the computing device to:
perform a coverage test for each putatively corresponding image,
wherein the instructions to cause the computing device to determine the one or matching images include instructions to cause the computing device to determine that a first coverage of the putatively corresponding image with respect to a second coverage of the first image meets a predefined threshold.

24. The non-transitory computer-readable storage medium of claim 22, wherein the instructions when executed to cause the computing device to perform the orientation consistency test on each transformation of the one or more transformation comprise instructions when executed to cause the computing device to:
for each feature point and putatively corresponding feature point in one of the one or more subsets of the plurality of putative correspondences corresponding to the transformation,
determine a first offset point by displacing the feature point from the putatively corresponding feature point in a direction of an orientation of the feature point;
apply the transformation to the first offset point to generate a second offset point; and
determine the transformation to be valid when an orientation of the corresponding feature point and an orientation of the second offset point are within a predefined tolerance limit.

25. The non-transitory computer-readable storage medium of claim 22, wherein the instructions when executed to cause the computing device to determine the one or matching images from the one or more of the plurality of images putatively corresponding to the first image comprises:
for each putatively corresponding image,
for each transformation of the at least one of the one or more transformations determined to be valid according to the orientation consistency test,
determine a number of inliers using the transformation and the plurality of putative correspondences between the first image and the putatively corresponding image; and
retain the transformation as a best transformation based on the number of inliers of the transformation being greater than a number of inliers of a current best transformation; and
determine that the putatively corresponding image comprises one of the one or more matching images when the number of inliers of the best transformation meets a specified threshold.

* * * * *